United States Patent [19]

Auch et al.

[11] Patent Number: 4,573,795
[45] Date of Patent: Mar. 4, 1986

[54] ROTATION RATE MEASURING INSTRUMENT

[75] Inventors: Wilfried Auch, Asperg; Friedemann Mohr, Renningen; Eberhard Schlemper, Vaihingen; Walter Steudle, Schlaitdorf, all of Fed. Rep. of Germany

[73] Assignee: International Standard Electric Corporation, New York, N.Y.

[21] Appl. No.: 417,510

[22] Filed: Sep. 13, 1982

[30] Foreign Application Priority Data

Sep. 16, 1981 [DE] Fed. Rep. of Germany ....... 3136688

[51] Int. Cl.$^4$ .............................................. G01B 9/02
[52] U.S. Cl. .................................................. 356/350
[58] Field of Search ......................................... 356/350

[56] References Cited

U.S. PATENT DOCUMENTS 4,280,766  7/1981  Goss et al. .......................... 356/350
4,408,882  10/1983  Sheem ................................ 356/350

OTHER PUBLICATIONS

Cahill et al., "Phase-Nulling Fiber-Optic Laser Gyro", Optics Letters, vol. 4, No. 3, Mar. 1979, pp. 93-95.
R. Ulrich, Optics Letters 5, 173 (1980).

*Primary Examiner*—Vincent P. McGraw
*Attorney, Agent, or Firm*—T. L. Peterson; R. C. Turner

[57] ABSTRACT

In the measuring instrument, a light beam generated by a laser (1) is split into two component beams (L(CW), L(CCW)) which travel along a coiled optical waveguide (7) in opposite directions. After traversing the optical waveguide, the two component beams are superimposed on each other (5) and directed to an optical-/electrical transducer (8). One of the two component beams (L(CW)) is frequency-modulated in a Bragg cell (6) before entering the optical waveguide (7), switchover being effected between two modulation frequencies (f1, f2) at a given frequency ($F_S$). The modulation frequencies are chosen so that, after traversal of the optical waveguide (7), the phase differences ($\phi_{B1}$, $\phi_{B2}$) between the two component beams (if the rotation rate $\Omega=0$) are $\pi/2$ and $3\pi/2$ or even integral multiples thereof. In case of rotation, the phase difference ($\phi_S$) caused by the Sagnac effect is superimposed on these phase differences. The output signal of the optical-/electrcal transducer (8) is passed through a band-pass filter (10) whose midfrequency is equal to the frequency at which switching takes place between the two modulating signals. The amplitude of the band-pass output signal is directly proportional to the rotation rate ($\Omega$). From this signal, a control signal can be derived which can be used to compensate for the phase difference ($\phi_S$) caused by the Sagnac effect.

11 Claims, 8 Drawing Figures

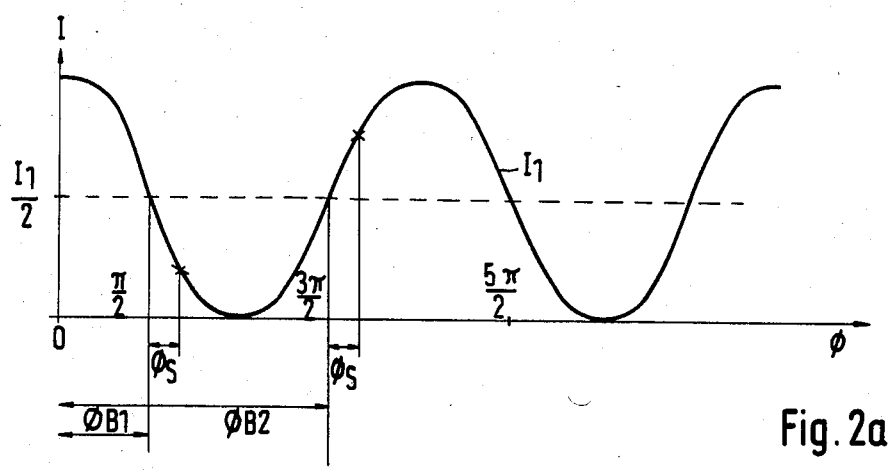
Fig. 2a
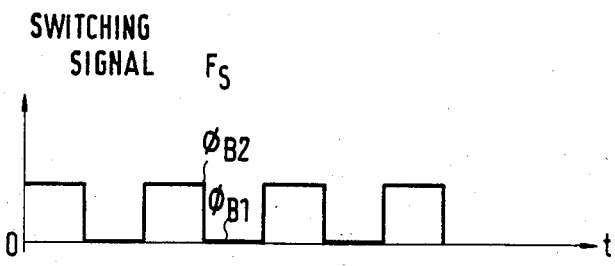
Fig. 2b
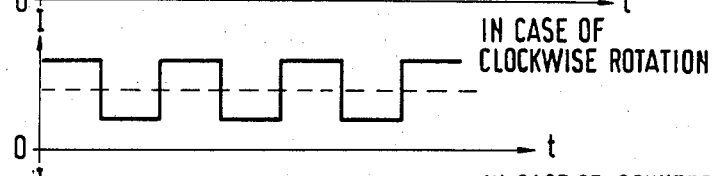
Fig. 2c
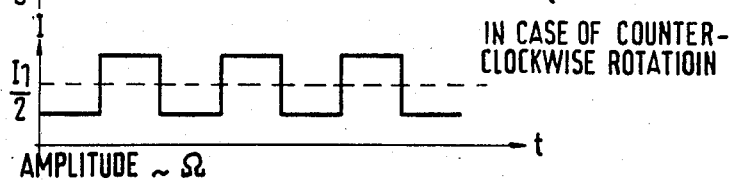
Fig. 2d
Fig. 2e
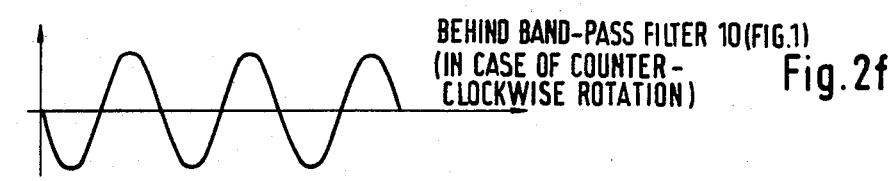
Fig. 2f

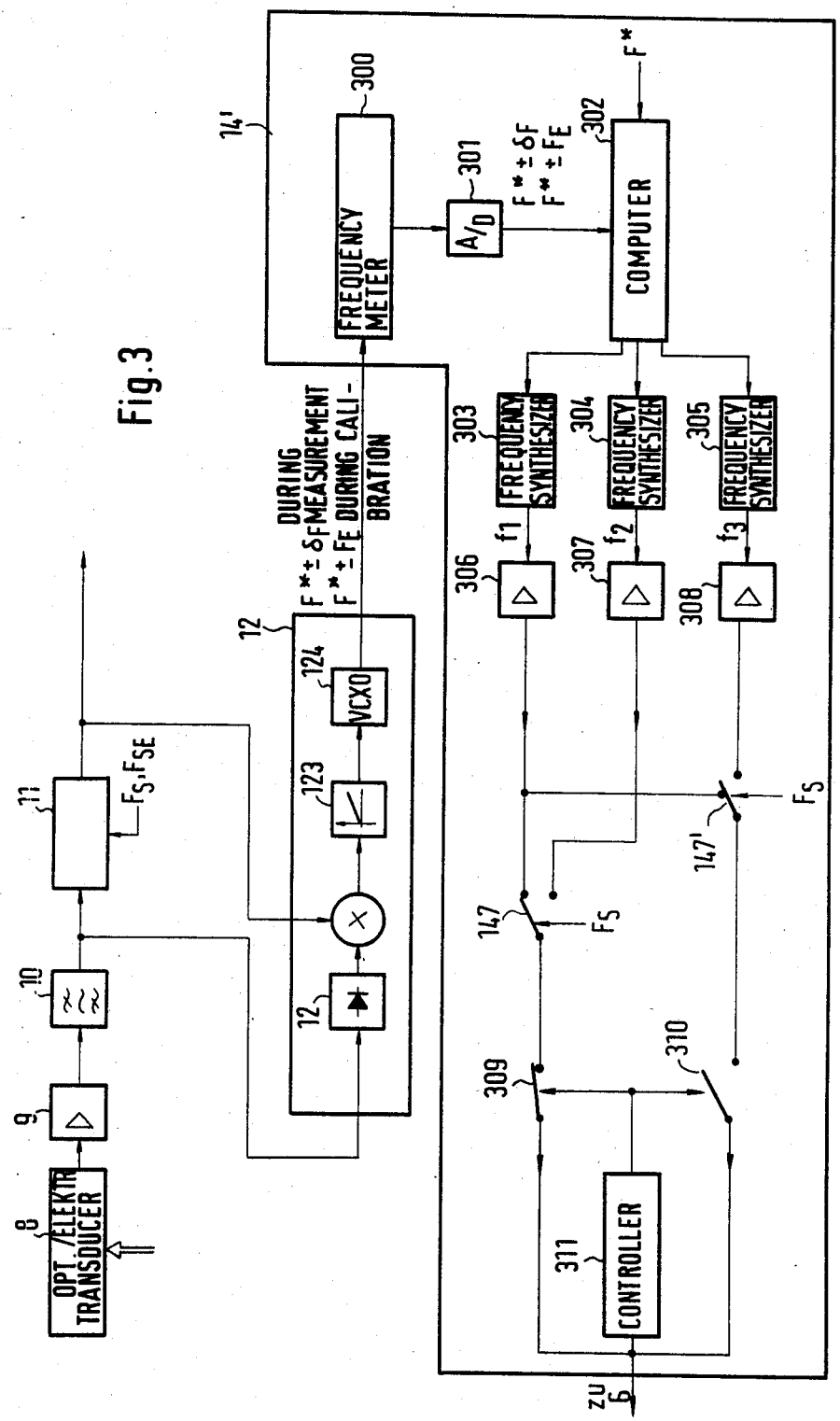

ROTATION RATE MEASURING INSTRUMENT

BACKGROUND OF THE INVENTION

The present invention relates to a rotation rate measuring instrument. An instrument of this kind is described in an article by J. L. Davis and S. Ezekiel, "Techniques for Shot-Noise-Limited Inertial Rotation Measurement Using a Multiturn Fiber Sagnac Interferometer", Proceedings of the Society of Photo-Optical Instrumentation Engineers, Volume 157, Laser Inertial Rotation Sensors, Aug. 30–31, 1978, San Diego, Calif. pages 131–136.

OBJECT

The object of the invention is to provide a rotation rate measuring instrument which permits high-accuracy measurements.

ADVANTAGES

With the solution described herein a highly stable control signal is obtained for maintaining the phase difference between the component beams travelling along the closed light path in opposite directions at a constant value. The rotation rate can also be determined directly from the amplitude of the signal from which the control signal is derived.

A development of the invention makes it possible to allow for variations of the scale factor (the scale factor gives the relationship between the phase difference between the two component beams due to the Sagnac effect and the rotation rate).

In another embodiment, it is possible in a simple manner to expand the measuring instrument so that the rotation rate can be measured about three mutually perpendicular axes.

In the embodiment in which the light paths are formed by optical waveguides embedded in a sealing compound, the influence of disturbing effects on the quantities entering the measurement is small.

BRIEF DESCRIPTION OF THE DRAWINGS

The invention will now be explained in more detail and by way of example with reference to the accompanying drawings, in which:

FIGS. 2a–2f show diagrams serving to explain the operation of the instrument of FIG. 1, and FIG. 3 is a block diagram of a development of the instrument of FIG. 1.

Figure 1:
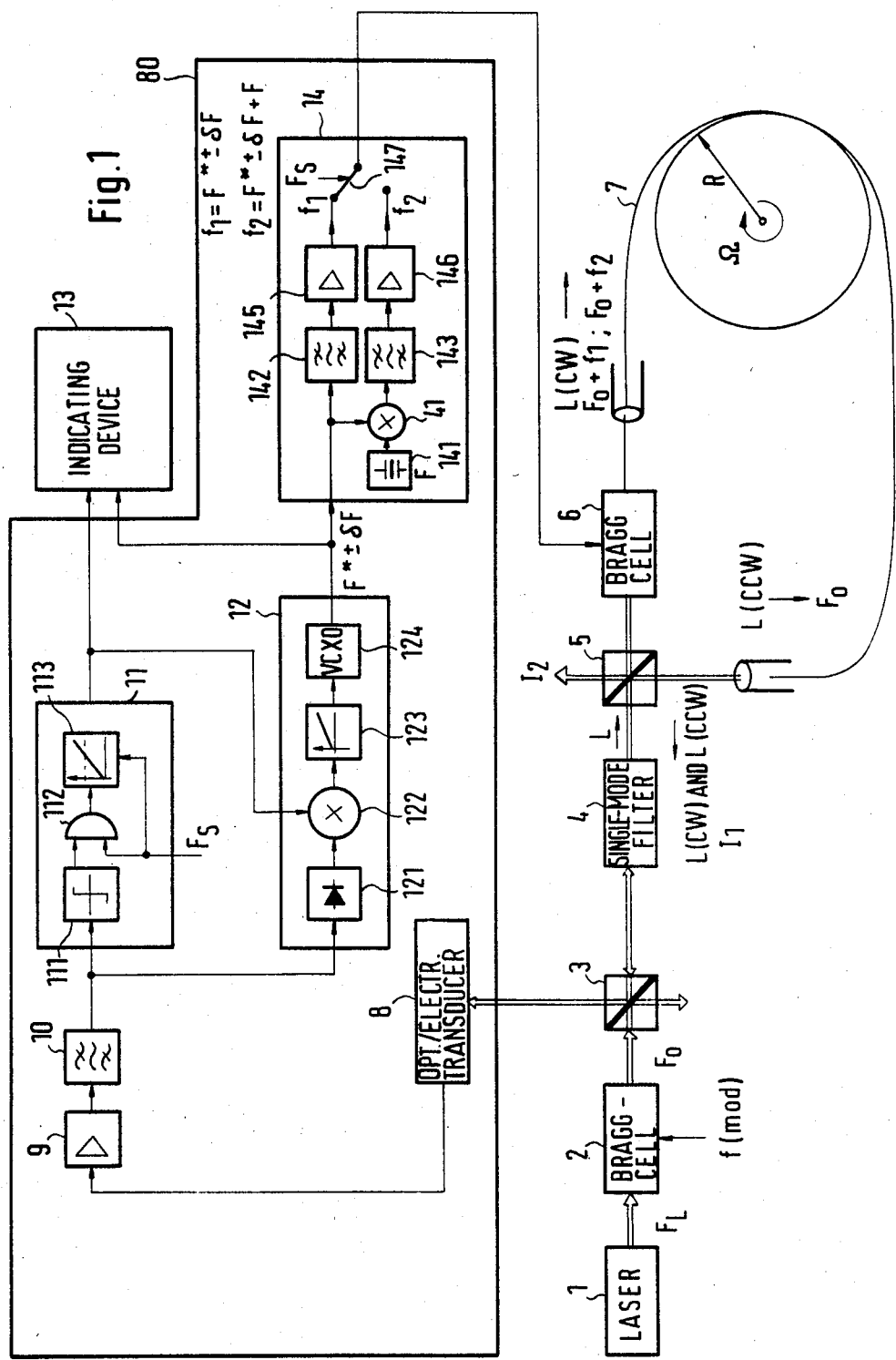
FIG. 1 is a block diagram of the rotation rate measuring instrument.

First, the design and operation of the rotation rate measuring instrument will be described with the aid of FIG. 1. A laser 1 generates a coherent light beam of frequency $F_L$, which passes through a Bragg cell 2, where it is modulated at the frequency f(mod). Through this frequency modulation with the constant value $f_{(mod)}$, the frequency of the output signal of the Bragg cell 2 is $F_o = F_L + f(mod)$.

The purpose of this Bragg cell is to prevent any light reflected to the laser 1 from interfering with the laser. Through the use of the Bragg cell 2, the reflected light has a frequency different from that of the light emitted by the laser, whereby any interference with the laser is prevented. After traversing the Bragg cell 2, the light beam passes through a first beam splitter 3 and a single-mode filter 4 to a second beam splitter 5. The second beam splitter 5 splits the light beam L into two component beams L(CW) and L(CCW), which are coupled into a closed light path 7 and travel along this path clockwise L(CW) and counterclockwise L(CCW), respectively.

One of the two component beams (in the FIG. 1 block diagram the component beam L(CW), which traverses the closed light path clockwise) is frequency-modulated in an additional Bragg cell 6. The choice of the modulation frequencies will be explained later.

The closed light path can be implemented in various ways, e.g. with suitably arranged mirrors. To obtain a long optical path length, the mirrors are arranged so that the light path has approximately the shape of a coil spring whose individual turns have the same radius.

In the embodiment being described, the closed light path is formed by an optical waveguide 7 arranged in the form of a coil. The radius of a turn is R. If the coil has m turns, the length of the entire light path is $L = 2\pi m$.

After emerging from the optical waveguide, the component beam L(CW) returns to the second beam splitter 5 direct, while the other component beam L(CCW) passes through the Bragg cell 6 before returning to the second beam splitter 5.

The beam splitters 3, 5 are designed to pass a first portion of the light beam impinging on them, to deflect a second portion through 90°, and to reflect a further portion which is small compared with the first and second portions.

The second beam splitter 5 is struck by two beams, namely the component beams L(CW) and L(CCW), after these beams have traversed the optical waveguide 7. These two component beams are superimposed on each other in the beam splitter 5, from which issue two mutually perpendicular light beams each resulting from the superposition of the two component beams. Their intensities are $I_1 = k \cdot \cos^2 \phi_s / 2$ and $I_2 = k \cdot \sin^2 \phi_s / 2$, where k is a constant, and $\phi_s$ is the phase shift between the two component beams due to the Sagnac effect, which will be dealt with later.

The light beam of intensity $I_1$ passes through the single-mode filter 4 to the first beam splitter 3, which deflects it to an evaluating unit 80, whose design and operation will be explained in detail later. The path of this deflected light beam is perpendicular to the path of the light beam travelling from the first Bragg cell 2 to the first beam splitter 3.

For beam guidance and for coupling the beams into and out of the individual components and the optical waveguide, further optical beam-focussing and imaging devices are required. These are familiar to those skilled in the art and have been omitted in the block diagram to simplify the illustration.

The beam splitters used may be of the same kind as those employed in the interferometer disclosed in the above reference, and a suitable laser is a HeNe laser. The single-mode filter is a single-mode optical waveguide 10 m in length. The optical waveguide 7 is a polarization-conserving single-mode optical waveguide.

If no polarization-conserving optical waveguide is used, further optical devices are necessary for polarization control and measurement. Suitable Bragg cells are those described in a publication by Soro, 26 rue Berthollet, 94110 Arcueuil, France, entitled "Modulateur OEM Acousto-Optique", Bulletin MD811. All devices employed are known per se.

The optical devices can be implemented wholly or in part using integratedoptic technology.

With Bragg cells (i.e., acoustooptical modulators), frequency modulation is possible. One portion of the input beam emerges from the Bragg cell unmodulated at a first angle, while the other portion emerges frequency-modulated (a frequency shift is produced at a constant modulation frequency) at a second angle. The angle of emergence of the frequency-modulated beam depends on the modulation frequency. An improvement in the separation of the modulated and unmodulated beams can be achieved in an advantageous manner by grinding the outside surface of the crystal of the Bragg cell in such a way that the modulated beam is normal to the outside surface.

In the following, the operation of the rotation rate measuring instrument and particularly of the evaluating unit 80 will be described.

If the two component beams propagate along the coil-shaped waveguide of length L in opposite directions, and the coil, whose radius is R, rotates about its axis at the angular velocity $\Omega$, the two component beams emerging from the optical waveguide differ in phase by $$\phi_S = \frac{4\pi L \Omega R}{\lambda C} \text{ (Sagnac effect)},$$

where $\lambda$ = vacuum wavelength of light, and $C$ = velocity of light in vacuo.

The expression $4\pi L \cdot R/\lambda C$ contains quantities which are constant only in principle, and is called "scale factor". Temperature variations and pressure effects may slightly change L and R, which results in errors in the measurement of $\Omega$.

The evaluating unit 80 contains an optical/electrical transducer 8, whose electric output signal is directly proportional to $I_1 = k \cos^2 \phi_S/2$. FIG. 2a shows how the intensity $I_1$ varies qualitatively with the phase difference between the two component beams after traversal of the optical waveguide. It can be seen that for small changes of $\phi$ (and, hence, $\phi_S$) in the range $\phi = 0$, the intensity $I_1$ hardly changes, i.e., the measurement accuracy is low in this range.

An improvement is advantageously obtained by introducing an additional constant phase shift $\phi_{B1}$ between the two component beams. $\phi_S$ is then superimposed on $\phi_{B1}$. If $\phi_{B1} = \pi/2$, small changes of $\phi_S$ result in a large change of $I_1$. The phase difference between the two component beams is then $\phi = \phi_S + \phi_{B1}$.

The additional phase shift $\phi_{B1}$ is produced by the second Bragg cell 6. To obtain the desired phase shift $\phi_{B1}$ between the two component beams, care must be taken to ensure that the Bragg cell is not located in the middle of the light path, i.e., in the middle of the optical waveguide 7, for the effects on the two component beams would then be the same. In the embodiment, the Bragg cell is located at one end of the optical waveguide.

The Bragg cell 6 modulates the component beam L(CW) at the frequency f1, so that the beam propagates through the optical waveguide at the frequency $F_o + f1$. The other component beam L(CCW) propagates through the optical waveguide at the frequency $F_o$. At rest, the phase difference $\phi_{B1}$ between the two component beams at the ends of the optical waveguide is $$\phi_{B1} = f_1 \frac{n \cdot L}{C} 2\pi,$$

where n is the refractive index of the optical waveguide.

In the novel rotation rate measuring instrument, switching is effected between two modulation frequencies f1 and f2 for the Bragg cell 6 and the frequency $F_S$ (FIG. 2b). The phase difference produced by the modulation at f2 is $$\phi_{B2} = f_2 \frac{n \cdot L}{C} 2\pi.$$

The difference between the two modulation frequencies f1 and f2 is chosen so that $$\phi_{B2} - \phi_{B1} = (2p - 1)\pi \text{ if } \phi_{B1} = \frac{\pi}{2}(2q - 1).$$

In this case (if $\phi_S = 0$, i.e., for zero rotation rate), $I_1$ for $\phi_{B1}$ is equal to $I_1$ for $\phi_{B2}$. Thus, no variation occurs at the optical/electrical transducer due to the switching (FIG. 2c).

The above condition for $\phi_{B2} - \phi_{B1}$ is a special case for the choice of the phase difference between $\phi_{B2}$ and $\phi_{B1}$. In general terms, the condition for the choice of the modulation frequencies (and, hence, of the phase difference) is as follows: The two modulation frequencies f1 and f2 must be chosen so that I1 has the same value for the phase shifts $\phi_{B1}$ and $\phi_{B2}$.

Things are different if rotation is taking place, i.e., if the phase difference $\phi_S$ is superimposed on the phase shifts $\phi_{B1}$ and $\phi_{B2}$. Now, as can be seen in FIG. 2a, I1 has different values depending on the respective modulation frequency (i.e, on the different phase shifts $\phi_{B1}$, $\phi_{B2}$). This is illustrated in FIG. 2d for clockwise rotation and in FIG. 2e for counterclockwise rotation. As long as the measurement is made in the linear portion of the characteristic, the difference between the maximum and the minimum values of this square-wave intensity curve is proportional to the rotation rate $\Omega$. This difference in intensity can be evaluated in a simple manner as follows (not shown in the drawings): The output signal of the optical/electrical transducer, which is a square wave, is applied to a band-pass filter whose midfrequency is equal to the switching frequency $F_S$. The band-pass filter provides a sine-wave signal having an amplitude A proportional to the rotation rate $\Omega$. $\Omega$ is calculated by the formula $\Omega = k \cdot k' \cdot A$, * where k and k' are apparatus constants which can be determined by the measurements for calibration.

The amplitude measurement is performed in the known manner. The direction of rotation is obtained by comparing the phase of the switching signal $F_S$ with that of the output signal of the band-pass filter.

Instead of directly evaluating the amplitude, it is also possible to control the phase difference between the two component beams L(CW) and L(CCW) so that it is maintained at a constant value. In this case, the control signal is directly proportional to the rotation rate.

The phase difference is preferably held at the values $(2p-1)\pi/2$, because in this case the measurement accuracy is highest for the reasons mentioned above. Then, $\phi_{B1} + \phi_S = \pi/2 (2p-1)$. To produce the phase difference $(2q-1)\pi$ between the two component beams after traversal of the optical waveguide, one of the two component beams is frequency-modulated (whereby the phase difference is produced) successively at f1 and f2. f1 is equal to $F^* \pm \delta F$, and f2 is equal to $F^* + F \pm \delta F$. $F^*$ is the frequency of a VCXO 124 when the control signal for the VCXO is zero. $\delta F$ is proportional to the rotation rate $\Omega$. F is chosen so that the desired phase difference of $\pi$ is produced between the component beams L(CW) and L(CCW).

This will be illustrated by a numerical example: L=1,400 m; $\phi_{B1}=6,801\ \pi/2$; $\phi_{B2}=6,803\ \pi/2$. From this it follows that $F^*=249.547$ MHz, F=73.4 MHz. $\delta F$ depends on the respective rotation rate and is, for example, 0.105 kHz for $\Omega=100$ degrees/h.

The signals having the frequencies f1, f2 are produced as follows.

As mentioned above, the output of the optical/electrical transducer 8 of the evaluating unit 80 provides a square-wave signal whose amplitude is proportional to the rotation rate $\Omega$, and whose frequency is $F_S$ (switching frequency between f1 and f2). This signal is passed through an amplifier 9 and a band-pass filter 10 of mid-frequency $F_S$. The output signal of the band-pass filter 10 is applied to a first device 11, in which the sign of the rotation rate is determined, and to a second device 12, which produces a control signal proportional to the magnitude of the rotation rate.

The device 11 contains a limiter 111 followed by an AND gate 112. The second input signal of the AND gate 112 is the switching signal $F_S$(FIG. 2b), which serves to switch between the modulation frequencies f1 and f2. The output signal of the AND gate is applied to a threshold integrator 113. The threshold is chosen to be exceeded in case of clockwise rotation and not to be exceeded in case of counterclockwise rotation, i.e., the integrator provides a 0 signal or a 1 signal depending on the direction of rotation.

The signal $F_S$ applied to the threshold integrator 113 direct. It resets the threshold circuit to zero after every period of $F_S$.

The 0 or 1 output signal of the threshold integrator 113 is applied to an indicating device 13, where it controls the indication of direction. It is also fed to the second device 12.

The device 12 contains a half-wave rectifier 121, a mixer 122, an integrator 123, and a voltage-controlled crystal oscillator 124 in series. The second input of the mixer 122 is fed with the output (0 or 1) from the integrator 113. Depending on whether the signal is 0 or 1, the sign of the amplitude of the half-wave signal provided by the half-wave rectifier 121 will be reversed or not reversed. Accordingly, the output signal of the integrator 123 has a positive or a negative sign. Depending on the sign of the control signal for the VCXO, the output frequency $F^*$ of the latter will be raised or lowered by $\delta F$ ($\delta F \sim \Omega$). The signal having the frequency $F^* \pm \delta F$ controls the indication of the rotation rate in the indicating device 13. To this end, the indicating device incorporates a frequency meter (e.g., a counter). From the frequency measured in the evaluating unit, the constant frequency $F^*$ must be deducted. This will be illustrated by a numerical example. In the evaluating unit 80, the frequency $F^* \pm \delta F$ is measured. Since $F^*=249,547$ MHz, $\delta F=0.105$ kHz, Thus, $$\Omega = \frac{\phi_S \cdot \lambda \cdot C}{4\pi L \cdot R} = 100\ \text{degrees/h}.$$

To achieve the switchover mentioned above, the output signal of the VCXO 124 is fed to a modulating-signal-generating circuit 14, where it passes through a bandpass filter 142 and is applied to an amplifier 145. An oscillator 141 generates a signal at frequency F, which, after being mixed with the VCXO output signal $F^* \pm \delta F$ in a mixer 41, passes through a bandpass filter 143 and is applied to an amplifier 146. A switch 147 switches at the frequency $F_S$ between the signals having the frequencies $f1=F^* \pm \delta F$ and $f2=F^* \pm \delta F + F$. These signals are the modulating signals for the second Bragg cell 6.

The individual components and their operation are familiar to those skilled in the art and, therefore, will not be explained here.

So far it has been assumed that only one second Bragg cell 6 is present. It is also possible, however, to pass the two component beams through one Bragg cell each before launching them into the optical waveguide. The modulation frequencies must then be chosen in accordance with the above considerations.

To reduce external influences on the optical waveguide to a minimum, the waveguide is advantageously embedded in a sealing compound. The sealing compound must be so constituted that sound waves incident from outside are absorbed, that as uniform a temperature distribution as possible results along the optical waveguide, and that its optical refractive index is approximately equal to the optical refractive index of the cladding of the optical waveguide. A suitable sealing compound is the material used for the secondary coating.

As mentioned above, during the frequency modulation in a Bragg cell, the modulated beam is slightly deflected as a function of the modulation frequency. This is utilized in another development to provide a triaxial measuring setup which requires only one evaluating unit.

The coiled optical waveguide 7 is replaced with three coiled optical waveguides.

The axes of these coils are mutually at right angles. With this arrangement, rotation rates about three directions can be measured.

The modulation frequencies for the three optical waveguides are chosen so that the component beams traverse only one optical waveguide at a time. The modulation frequencies thus depend, on the one hand, on the above phase conditions, and, on the other hand, on the spatial arrangement of the optical waveguides in relation to the Bragg cell. At a modulation frequency of 250 kHz, the angle between the unmodulated beam and the modulated beam is 2.4 degrees.

The rotation rate is evaluated using time-division multiplexing. Only one evaluating unit is required.

The result of the measurement is affected by noise. The noise is caused mainly by the interference of the light scattered back into the fiber with the component beams travelling along the optical waveguide. It can be reduced by using lasers with short coherence lengths. However, this has various disadvantages.

A reduction of the coherence length in lasers having a long coherence length is advantageously achieved by modulating the light beam in a suitable manner. A suitable modulation is, for example, a frequency modulation with a sinusoidal signal or a statistical modulation.

The modulating signal is preferably applied to the first Bragg cell 2. It may also be applied to two second Bragg cells 6. In the latter case, however, care must be taken to ensure that this modulation causes no additional variations in the difference between the frequencies of the output signals of the second Bragg cells.

A further development makes it possible to provide control which holds constant the position of the operating point (FIG. 2a) around which $\phi_S$ varies.

As in the above-described case of rotation-rate measurements, two modulating signals with different frequencies f1 and f3 are applied to the Bragg cell 6 (FIG. 1) in succession. Now, however, the frequencies are chosen so that, after traversal of the optical waveguide, the two component beams differ in phase by $2\pi$ or an integral multiple thereof (if the rotation rate is zero). The frequencies necessary for this are again calculated by the equation $$\phi_B = \frac{\Delta f_{mod} \cdot n \cdot L}{C} 2\pi$$

The modulating frequencies can be fixed and kept highly stable with crystal accuracy.

As can be seen from the diagram of FIG. 2a, the output signal has the same intensity after every cycle of $2\pi$. This is also the case if rotation is taking place, i.e., if the phase shift between the two component beams is $$\phi = \phi_{B1} + \phi_x.$$

Switching between the two modulation frequencies f1, f3 is effected at the frequency $F_S$.

The evaluation corresponds to the evaluation of the rotation rate $\Omega$.

To make it easier to understand how the corrections are performed, the phase differences are first assumed to be $\pi/2$ (produced with the modulating f1), $3\pi/2$ (produced with the modulating signal f2), and $5\pi/2$ (produced with f3). If n or L in the equation for $\phi_B$ (page 6) varies, the position of the operating point changes as well. As a result, the phase differences between the signals obtained by modulation with the unchanged signals f1, f2 and f3 are no longer $\pi$ and $2\pi$.

This is utilized to change f3 in such a way that the phase difference becomes $2\pi$ again. To do this, the frequency of the input signal of the VCXO 124 is changed by $\pm F_E$, i.e., f1 = F + $\pm F_E$. This correction applies for the phase value at $\phi_{B1}$. Since, if the above quantities are assumed to vary, the period of the curve for $I_1$ has a value different from that in the unperturbed condition, corrections for the frequencies f2 and f3 are not equal to $\pm F_E$, but it is necessary to take into account the respective phase value, i.e., to take care that the correction is performed at a suitable point on the curve $I_1$. For the assumed phase differences $\phi_{B1} = \pi/2$, $\phi_{B2} = 3\pi/2$, and $\phi_{B3} = 5\pi/2$, the modulation frequencies change as follows (if $\Omega = 0$):

f1 = F* ± $F_E$ f2 = F* ± $F_E$ + (F ± 2$F_E$)

f3 = F* ± $F_E$ + 2(F ± 2$F_E$)

If $\Omega \neq 0$, the modulation frequencies f1, f2 and f3 are f1 = F* ± $F_E$ ± $\delta F$ f2 = F* ± $F_E$ + 2(F ± 2$F_E$) ± $\delta F$ f3 = F* ± $F_E$ + 2(F ± 2$F_E$) ± $\delta F$ If the operating points are not at $\pi/2$, $3\pi/2$, and $5\pi/2$ as shown in FIG. 2a, but, as is the case with modulation frequencies of about 249.547 MHz, about 249.621 MHz, and about 249.694 MHz, at phases of $\phi_{B1} = 6,801 \cdot \pi/2$, $\phi_{B2} = 6,803 \cdot \pi/2$, and $\phi_{B3} = 6,805 \ \pi/2$, the modulation frequencies (for $\Omega = 0$) are f1 = F* ± 6801 $F_E$ f2 = F* ± 6801 $F_E$ + (F ± 2$F_E$)

f3 = F* ± 6801 $F_E$ + 2(F ± 2$F_E$).

The correcting quantity $F_E$ is a measure of changes of n and L. Assuming that n is constant, and that R and L undergo equal relative changes, the changes R can be estimated and taken into account for the scale factor. This makes it possible to allow for variations of L and R in the evaluation of $\Omega$.

In the simplified case ($\pi/2$, $3\pi/2$, $5\pi/2$), $$\Delta L = \frac{F_E \cdot L}{f1}$$

and $$\Delta R = \frac{\Delta L}{L} \cdot R,$$

assuming $\frac{\Delta L}{L} = \frac{\Delta R}{R}$.

When the correction is to be made, the evaluating unit is no longer driven by $\delta F$ direct, but a computer in the evaluating unit 13 is fed with $\delta F$ in digital form, from which it calculates the rotation rate $\Omega$ by the equation $$\Omega = \frac{\delta F(n \cdot \lambda)}{2(R + \Delta R)}$$

R was previously calculated by this computer according to the equation $$\Delta R = \frac{F_E \cdot R}{f1}.$$

$F_E$ was previously determined and is also fed to the computer in digital form. The other quantities for calculating $\Omega$ are constant and are stored in the computer. This computer then controls the indication of the magnitude of $\Omega$.

How such a calibration facility may be implemented will now be explained with the aid of Fig. 3.

In the embodiment of Fig. 1, a signal with the frequency F* ± $\delta F$ was present at the output of the VCXO 124. In the embodiment of Fig. 3, the operations "measurement" and "calibration" are assumed to take place successively, not simultaneously. During measurement, switching is effected at the frequency $F_S$ between the modulating signals f1 and f2; during calibration, switching is effected at the frequency $F_S$ between the modulating signals f1 and f3. A controller 311 determines whether a switch 309 or a switch 310 transfers the signals for measurement or calibration, respectively. The calibration is preferably performed while $\Omega$ is changing only little. The control may also be initiated by manual operation.

The output signals of the VCXO have the frequency F* ± $\delta F$ during measurement and the frequency F* ± $F_E$ during calibration. A frequency meter 300 measures the respective frequency and feeds it to a computer 302 through an A/D converter 301. In the computer 302, which also holds the frequency F*, control signals are produced from F*, F, δF and $F_E$ which cause frequency synthesizers 306, 307 and 308 to provide signals having the frequencies f1, f2 and f3.

The signals f1 and f2 are applied to the switch 309, and the signals f1 and f3 are applied to the switch 310. The three frequency synthesizers may be replaced with a single programmable frequency synthesizer.

If calibration and measurement are to be performed simultaneously, some of the devices must be duplicated, and switchover must be effected between the calibration and measurement modulating signals at different frequencies which have a given relationship to each other.

We claim:

1. An instrument based on Sagnac effect for measuring the rotation rate of a mechanical member comprising:
   a closed light path of substantially constant radius circumferentially disposed about a rotating circle having a center coincident with the center of rotation of said mechanical member;
   means for generating a coherent light beam, and means for splitting said light beam into two separate light beams for propagation through said closed light path one split beam into a clockwise direction and the other split beam in a counterclockwise direction;
   means for frequency modulating one of said split light beams with cyclically alternating first and second modulation frequencies, said one split light beam thereby having a phase shift $\phi_{B1}$ introduced as a separately identifiable characteristic;
   means for superimposing said two light beams in a return light beam from said closed light path, said return light beam having components of intensities $\cos^2(\phi s/2)$ and $\sin^2(\phi s/2)$, where $\phi s$ is a phase shift between said two light beams due to said Sagnac effect that is proportional to rate of rotation; and
   means for measuring the differential phase shift $\phi$ between the light signals of said two beams after passage through said light path where $\phi = \phi s + \phi_{B1}$ as a measurement of the angular velocity of said mechanical member.

2. Apparatus for measuring the rotation rate of a rotating member comprising:
   an enclosed light path, a light beam source and means for splitting said light beam into first and second component beams and for directing said first component beam into said light path from a first end thereof and said second component beam into said light path from a second end thereof;
   means for frequency modulating said second component beam before it is directed into said second end of said light path, said modulation being periodically alternated between two different modulation frequencies;
   means for superimposing said first and second component beams after they have propagated in opposite directions through said light path and for directing said superimposed beams toward said light beam source;
   means inserted in the light path between said light beam source and said superimposing means for passing said light beam from said source to said enclosed light path and for directing at least a fraction of said superimposed beams away from said source as a fourth beam;
   control means responsive to said fourth beam for producing a control signal for said two different modulation frequencies as a function of the intensity of said fourth beam to generate a predetermined phase difference between said first and second component beams at the input of said superimposing means, said predetermined phase difference being of a predetermined value when said rotating member has a zero angular velocity; and
   means responsive to said control signal for displaying the rate of rotation.

3. Apparatus according to claim 2 including means responsive to said control signal for controlling said frequency modulating means to generate said modulation frequencies such that the intensity values of said component beams combined in said superimposing means are equal when said rotating member has zero angular velocity.

4. Apparatus according to claim 2 in which said means for producing said control signal includes an optical/electrical transducer responsive to said superimposed beams for generating said electrical output signal.

5. Apparatus according to claim 2 in which said coherent light beam source is a laser and input modulating means are included between said light beam source and said means for producing said fourth beam from said superimposed beams, thereby frequency modulating the light energy of said light beam from said source so that there is no interaction between said superimposed beams and said laser that would tend to shift the frequency of said laser.

6. Apparatus according to claim 2 in which said means for frequency modulating said second component beam comprises a Bragg cell inserted in the light path between said second end of said closed light path and said superimposing means, with said control means supplying said modulation frequencies to said Bragg cell as electrical signals.

7. Apparatus according to claim 5 in which said input modulating means comprises a Bragg cell frequency modulating the light energy of said laser in response to an externally supplied constant frequency signal.

8. A rotation rate measuring instrument comprising means for generating a coherent light beam, means for splitting said light beam into two component beams and means for causing said two component beams to traverse a closed light path in opposite direction, means for frequency modulating at least one of said two component beams alternately at two different frequencies $f_1$ and $f_2$ which result in two different periodic phase differences $\phi_{B1}$ and $\phi_{B2}$ between the two component beams over equal periods and, after traversing the light path, have a first phase difference $\phi_{B1}$ between them which, if the rotation rate is zero, depends only on the frequency modulation, means for combining the two component beams, after traversing the closed light path, whereby said two component beams are superimposed on each other, an optical/electrical transducer for detecting a signal $I_1 = k \cos^2(\phi s/2)$ from the superimposed component beams, where $\phi s$ is the phase shift between the two component beams due to a Sagnac effect, and means responsive to said signal $I_1$ for evaluating the phase shift $\phi_S$ introduced by the Sagnac effect and present in addition to the first phase shift $\phi_{B1}$ and means for generating a control signal for said modulating means which compensates for the additional phase shift $\phi_S$ due to rotation and from which the rotation rate is determined, wherein the two modulation frequencies $f_1$ and $f_2$ are chosen so that the output signal of the optical-/electrical transducer has equal amplitudes during both modulation frequencies when the rotation rate is zero.

9. A rotation rate measuring instrument as defined in claim 8 including at the output of said optical/electrical transducer a band-pass filter whose midband frequency is approximately equal to the switching frequency of the frequency modulating means whereby said control signal is derived from the output signal of said band-pass filter.

10. A rotation rate measuring instrument as defined in claim 9, including means responsive to the output signal of said band-pass filter for determining the direction of rotation and for producing a sign signal indicating direction of rotation, and said frequency modulating means includes a voltage-controlled oscillator for multiplying the output of said band-pass filter by said sign signal, means to produce a control signal for said voltage controlled oscillator, whereby the output signal of the voltage-controlled oscillator indicates the magnitude of the rotation rate, and means for supplying the output signal of the voltage-controlled oscillator to said modulating means from which the two modulating frequencies are generated.

11. A rotation rate measuring instrument as defined in claim 10 wherein calibrations are made at or during the measurement using means for time-division multiplexing modulation frequencies at which the two component beams, after traversing the closed light path, differ in phase by $2\pi$, or integral multiples thereof, when the quantities whose variations are to be determined have their desired values, whereby deviations from this value are used to determine any variations of the quantities entering the rotation rate measurement, which should actually be constant, for calibration purposes.

* * * * *